United States Patent
McGlaughlin et al.

(10) Patent No.: US 8,441,922 B1
(45) Date of Patent: May 14, 2013

(54) METHOD AND SYSTEM FOR CONGESTION MANAGEMENT IN NETWORKS

(75) Inventors: Edward C. McGlaughlin, Minneapolis, MN (US); Manoj Wadekar, San Jose, CA (US); Renae M. Weber, West Saint Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 148 days.

(21) Appl. No.: 13/216,598

(22) Filed: Aug. 24, 2011

Related U.S. Application Data (60) Provisional application No. 61/389,988, filed on Oct. 5, 2010.

(51) Int. Cl.
*G01R 31/08* (2006.01)

(52) U.S. Cl.
USPC .............................................. 370/218; 710/32

(58) Field of Classification Search .......... 370/216–228; 710/32, 52
See application file for complete search history.

(56) References Cited

U.S. PATENT DOCUMENTS

| | | | | |
|---|---|---|---|---|
| 5,737,314 A | * | 4/1998 | Hatono et al. | 370/235 |
| 2006/0155938 A1 | * | 7/2006 | Cummings et al. | 711/149 |
| 2010/0067536 A1 | * | 3/2010 | Beshai | 370/401 |
| 2010/0325370 A1 | * | 12/2010 | Cummings et al. | 711/149 |

\* cited by examiner

*Primary Examiner* — Phuc Tran
(74) *Attorney, Agent, or Firm* — Klein, O'Neill & Singh, LLP (57) ABSTRACT

In a network having a computing system interfacing with a storage system via a switch, an average transmit wait count value is compared with a first threshold value. The average transmit wait count value is updated when a switch port has a frame available for transmission but is unable to transmit the frame if a port of the storage system is unable to receive the frame or if another switch port is unable to receive the frame. A congestion message is generated for notifying a management module of congestion at the switch port when the average transmit wait count value reaches the first threshold value. Depending upon the characteristics of the congestion, a notification is sent to the computing system to either only reduce a rate of write operations to reduce congestion, or to reduce both the rate of write operations and a rate of read operations.

20 Claims, 8 Drawing Sheets

| Initiator Identifier 138A | Target Identifier 138B | From-Domain Identifier 138C | To-Domain Identifier 138D | Hop Count Value 138E |
|---|---|---|---|---|
| 101A | 124 | Switch 118 | Switch 122 | 1 |

| Parameter 312 | Value 314 |
|---|---|
| Message Type 312A | [Edge Congestion \| Interior Congestion \| Congestion Over] 314A |
| Source Domain ID 312B | Switch Domain ID of congested switch 314B |
| Destination ID 312C | [Destination Domain ID \| Target ID] 314C |

| Parameter 312 | Value 314 |
|---|---|
| Message Type 312A | Edge Congestion 314D |
| Source Domain ID 312B | Switch Domain ID of congested switch 314E |
| Destination ID 312C | Target ID 314F |

| Parameter 312 | Value 314 |
|---|---|
| Message Type 312A | Interior Congestion 314G |
| Source Domain 312B | Switch Domain ID of congested switch 314H |
| Destination ID 312C | Destination Domain ID 314I |

| Parameter 312 | Value 314 |
|---|---|
| Message Type 312A | Congestion Over 314J |
| Source Domain 312B | Switch Domain ID of congested switch 314K |
| Destination ID 312C | [Destination Domain ID | Target ID] 314L |

METHOD AND SYSTEM FOR CONGESTION MANAGEMENT IN NETWORKS

CROSS-REFERENCE TO RELATED APPLICATION

This patent application claims priority to the U.S. Provisional Patent Application Ser. No. 61/389,988, entitled "SAN FABRIC CONGESTION CONTROL," filed on Oct. 5, 2010, the disclosure of which is incorporated herein by reference in its entirety.

TECHNICAL FIELD

The present embodiments relate to networks.

BACKGROUND

A computer network, often simply referred to as a network, typically includes a group of interconnected computers and devices that facilitate communication between users, and that allows users to share resources. Adapters, switches and other devices are typically used during network communication.

Often, a computing system in a network, referred to herein as an initiator, may use a storage device at a target system to read and write information. The rate at which information is written and/or read may cause congestion at one or more switches that are used to access the storage device. Continuous efforts are being made to improve network communication and reduce congestion.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide advantages.

One of the present embodiments comprises a machine implemented method for a network having a computing system interfacing with a storage system via a switch. The method comprises comparing an average transmit wait count value with a first threshold value. The average transmit wait count value is updated when a switch port has a frame available for transmission but is unable to transmit the frame if a port of the storage system is unable to receive the frame or if another switch port is unable to receive the frame. The method further comprises generating a congestion message for notifying a management module of congestion at the switch port when the average transmit wait count value reaches the first threshold value. The method further comprises notifying the computing system to only reduce a rate of write operations to reduce congestion, when the port of the storage system is unable to receive the frame. The method further comprises notifying the computing system to reduce both the rate of write operations and a rate of read operations, when the another switch port is unable to accept the frame.

Another of the present embodiments comprises a system. The system comprises an initiator operationally coupled to a storage system via a first switch element and a second switch element for reading information from the storage system and writing information at the storage system. The system further comprises a management system operationally coupled to the initiator, the first switch element and the second switch element. The second switch element includes a first port coupled to the first switch element that is also coupled to the initiator, a second port coupled to the storage system, a transmit counter that counts a duration that the second port waits to transmit an available frame, and a processor that compares an average transmit wait count value with a first threshold value. The average transmit wait count value is updated when the second port has a frame available for transmission but is unable to transmit the frame if a port of the storage system is unable to receive the frame or if another switch port is unable to receive the frame. The processor generates a congestion message notifying the management module of congestion at the second port when the average transmit wait count value reaches the first threshold value. The management module notifies the initiator to reduce a rate of write operations to reduce congestion when the port of the storage system is unable to accept the frame, and to reduce both the rate of write operations and a rate of read operations when the another switch port is unable to accept the frame.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIG. 10 shows an example of a system used by a switch for generating a path data structure, according to one embodiment.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "system," and "functionality" represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be readable by a computing system, and encoding a computer program of instructions for executing a computer process.

Figure 1A:
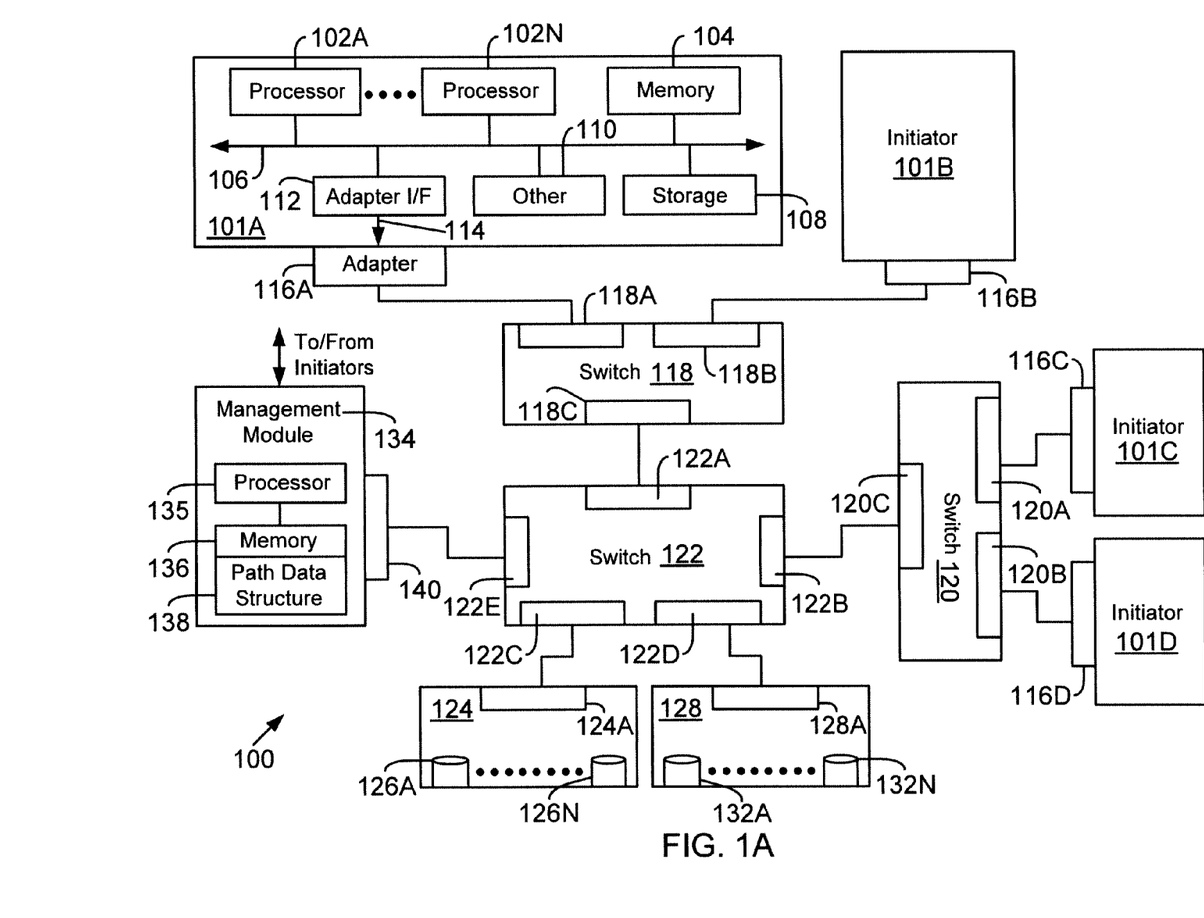
FIG. 1A shows a block diagram of a system according to one embodiment.

System 100:

FIG. 1A is a block diagram of a system 100 for implementing the various embodiments disclosed herein. In one embodiment, system 100 may include a plurality of computing system 101A-101D (may also be referred to as "initiator 101") communicating with target systems 124 and 128 via a plurality of switches 118, 120 and 122. Initiators 101A-101D interface with targets 124 and 128 via adapters 116A-116D, generically referred to as "adapter 116."

The term target as used herein means a storage system that provides access to storage space for storing information. There may be other systems/components that may be placed between the aforementioned components but they are not germane to the embodiments disclosed herein. It is noteworthy that the embodiments disclosed herein are not limited to any particular number of initiators, targets, switches or adapters.

Initiator 101 may include one or more processors 102A-102N (jointly referred to as processor 102), also known as a central processing unit (CPU), interfacing with other components via an interconnect (also referred to as a bus) 106. Processor 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Bus 106 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of interconnect.

Initiator 101 may also include a storage device 108, which may be for example a hard disk, a CD-ROM, a non-volatile memory device (flash or memory stick) or any other type of storage device. Storage device 108 may store processor executable instructions and data, for example, operating system program files, application program files, and other files. Some of these files are stored on storage 108 using an installation program. For example, the processor 102 may execute computer-executable process steps of an installation program so that the processor 102 can properly execute the application program.

Initiator 101 interfaces with a memory 104 that may include random access main memory (RAM), and/or read only memory (ROM). When executing stored computer-executable process steps from storage device 108, the processor 102 may store and execute the process steps out of memory 104.

Initiator 101 may also include other devices and interfaces 110, which may include a display device interface, a keyboard interface, a pointing device interface and others.

Initiator 101 may also include an adapter interface 112 to interface with adapter 116 via a link 114. Link 114 may be a peripheral bus, for example, a PCI, PCI-X or PCI-Express link or any other type of interconnect system. Adapter 116 may be configured to handle both network and storage traffic using various network and storage protocols. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCoE) has been developed to handle both Ethernet and Fibre Channel traffic in a storage area network (SAN). This functionality would allow Fibre Channel to leverage 10 Gigabit Ethernet networks while preserving the Fibre Channel protocol. Adapter 116 shown in FIG. 1A may be configured to operate as a FCoE adapter. QLogic Corporation, the assignee of the present application, provides one such adapter. Those of ordinary skill in the art will appreciate, however, that the present embodiments are not limited to any particular protocol.

Switch 118 is used to connect initiators 101A-101B with other devices. As an example, switch 118 may include ports 118A-118C for providing such connectivity. Ports 118A-118C may include logic and circuitry for receiving and routing information to a destination. In one embodiment, port 118A is coupled to adapter 116A, while port 118B is coupled to adapter 116B. Adapter 116A is coupled to initiator 101A, while adapter 116B is coupled to initiator 101B.

In one embodiment, switch 120 is similar to switch 118 and may include ports 120A-120C. Ports 120A-120C may also include logic and circuitry for receiving and routing information to a destination. In one embodiment, port 120A is coupled to adapter 116C, while port 120B is coupled to adapter 116D. Adapter 116C is coupled to initiator 101C, while adapter 116D is coupled to initiator 101D.

In one embodiment, switch 122 is connected to switch 118, 120 and target systems 124 and 128, respectively. Switch 122 may include ports 122A-122E. Port 122A is coupled to port 118C of switch 118. Port 122B is coupled to port 120C of switch 120. Port 122C is coupled to port 124A of target system 124, while port 122D is coupled to port 128A of target system 128.

It is noteworthy that the embodiments disclosed herein are not limited to any particular number of ports for switches 118, 120 and 122.

Target system 124 includes storage devices 126A-126N and target system 128 includes storage devices 132A-132N. Storage devices 126A-126N/132A-132N may be used to store information on behalf of initiators 101A-101D. Target systems 124 and 128 include other components, for example, a processor, adapter, memory and others that have not been described in detail.

In one embodiment, port 122E of switch 122 is coupled to adapter 140 of a management module 134. Adapter 140 may be used to send and receive network information for management module 134.

In one embodiment, management module 134 may be a computing system similar to initiator 101 that has been described above. For example, management module 134 at least includes a processor 135 that has access to a memory 136 and a storage device (not shown). Processor 135 maintains a path data structure 138 at memory 135 for handling congestion at any of the switches 118, 120 and 122. Path data structure 138 is described in more detail below.

Figure 1B:
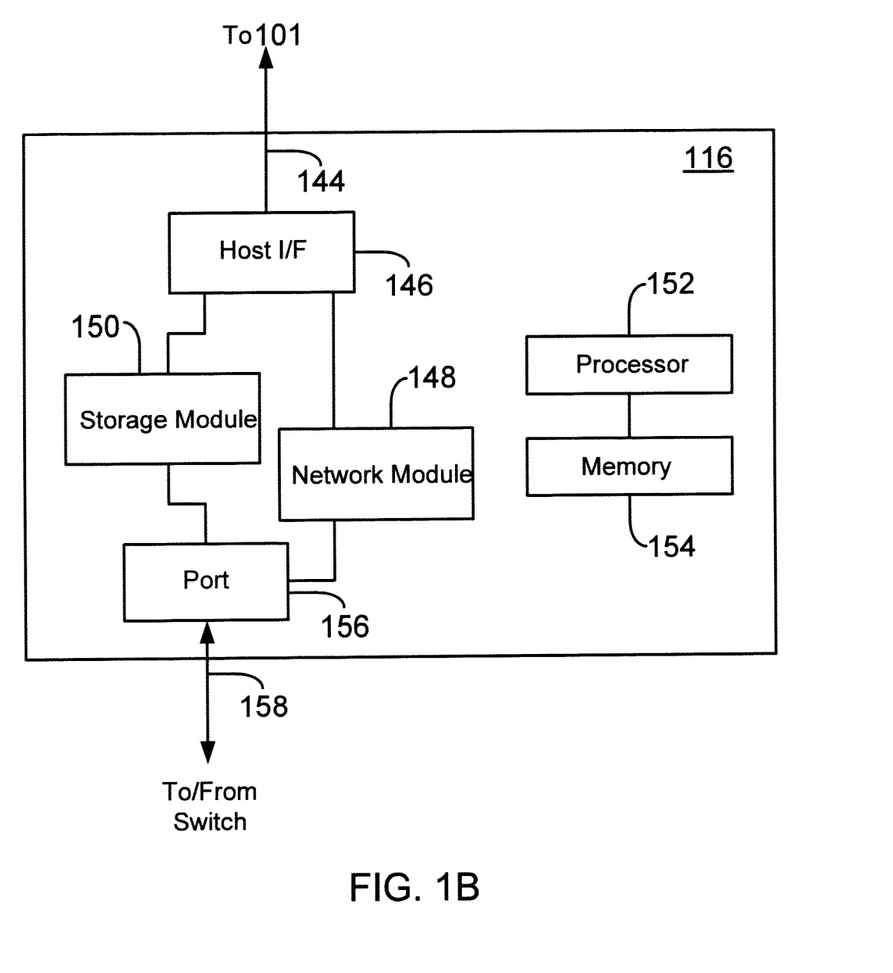
FIG. 1B shows a block diagram of an adapter according to one embodiment.

Adapter 116:

Before describing details regarding the various embodiments, the following provides a brief description of adapter 116 with respect to FIG. 1B. Adapter 116 may be used to generate input/output (I/O) requests for storing information or getting information from targets 124 and 128.

In one embodiment, adapter 116 may include a host interface 146, network module 148, storage module 150, adapter processor 152 and memory 154. The host interface 146 is configured to interface with initiator, via bus 144. As an example, bus 144 may be a PCI, PCI-X, PCI-Express or any other type of interconnect.

Memory 154 may be used to store programmable instructions, for example, firmware. The adapter processor 152 executes firmware stored in the memory 154 to control overall functionality of adapter 116 and also interface with host 101 and other devices.

Network module 148 is used to process network packets, while storage module 150 is used to process storage traffic. Port 156 interfaces with other devices, for example, switch 120, via bus 158.

Figure 1C:
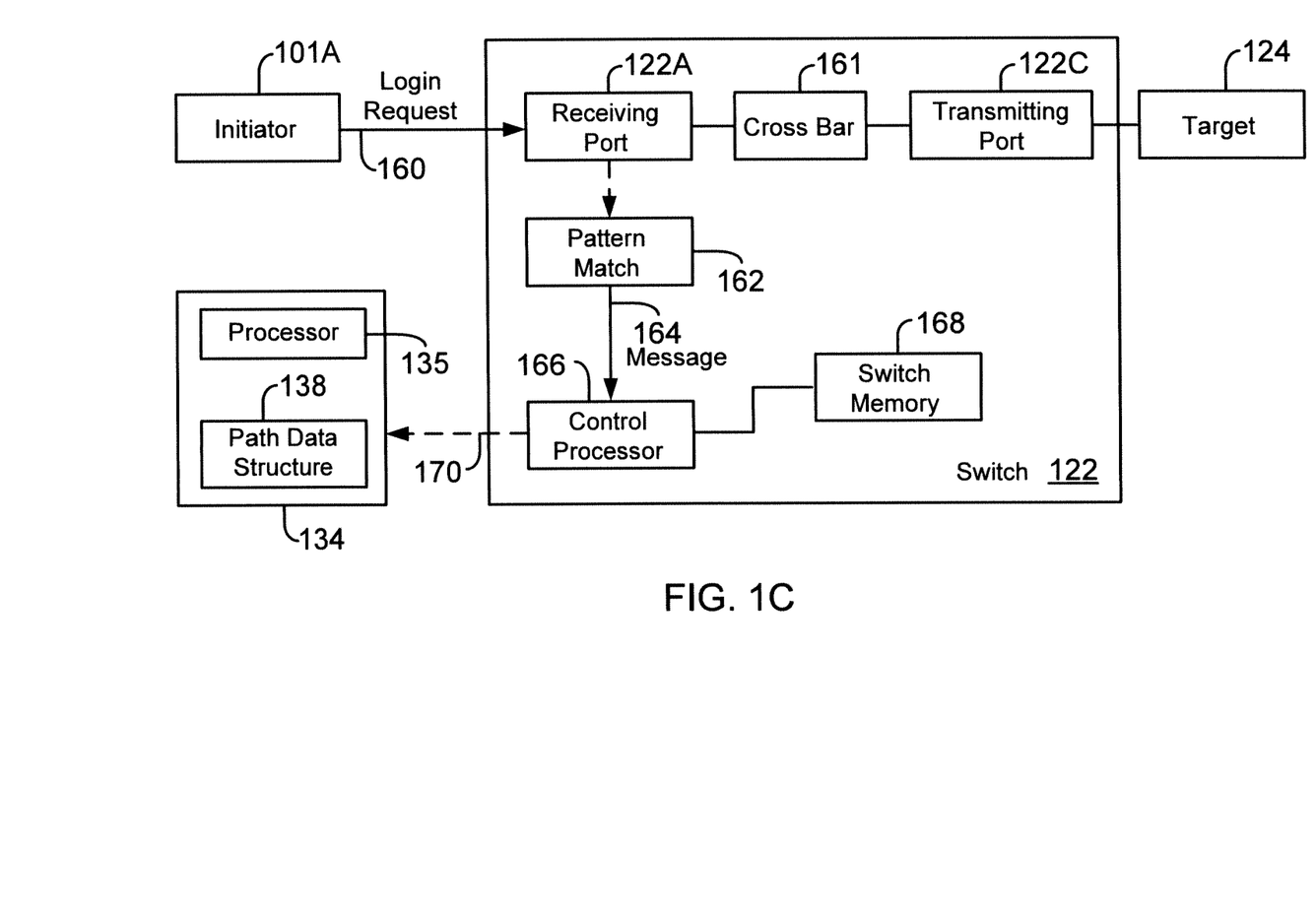
FIG. 1D shows an example of the path data structure generated by the system of FIG. 10, according to one embodiment.
FIG. 1E shows a block diagram of a congestion detection system, according to one embodiment.

Switch 122:

FIG. 1C shows a block diagram of switch 122 interfacing with management module 134, according to one embodiment. The structure of switch 122 may be similar to the structure of switches 118 and 120. There may be other components of switch 122 that are not germane to the embodiments disclosed herein and hence may not have been shown or described.

Switch 122 includes a processor 166 that executes programmable instructions out of switch memory 168 for controlling the overall switch 122 operations and executing some of the process steps of the present embodiments. Processor 166 communicates with switch ports 122A-122E (FIG. 1A), executes process steps to detect network congestion and then notifies management module 134 of congestion status.

To start communication with a target system, for example, 124, initiator 101A typically sends a login request 160. The nature and structure of the login request 160 depends on the protocol/standard used for communication. For example, in a Fibre Channel network, the login request may be a "PLOGI" request that is defined by the Fibre Channel standards. The PLOGI request identifies initiator 101A and target system 124.

The login request 160 may be received by port 122A (shown as receiving port 122A) via port 118C of switch 118. The login request is sent to port 122C (shown as transmitting port 122C) via a crossbar 161 that is used for communication between switch ports 122A-122E (FIG. 1A). The login request is then sent to target system 124 via port 124A (FIG. 1A) to establish a communication nexus between initiator 101A and target system 124. The nexus enables initiator 101A to send and receive information to and from target system 124.

The receiving port 122A is coupled to a pattern match module 162, according to one embodiment. Pattern match module 162 inspects the header of a frame received at port 122A. When a PLOGI is received, pattern match module 162 is able to detect the request because of its format. The pattern match module 162 forwards a copy of the PLOGI request to processor 166.

Processor 166 then generates a connection event message 170 that is sent to management module 134 via port 122E (FIG. 1A) of switch 122. Processor 166 performs a Fibre Channel Trace Route operation as provided by the Fibre Channel standards to determine the path from initiator 101A to target 124. The path provides a record of the various switch domains that a packet from initiator 101A has to traverse before being delivered to target 124. The connection event message 170 includes identifiers that identify initiator 101A and target 124 as well as switches 118 and 122.

Processor 135 of the management module 134 receives the connection event message 170 and adds the information from the message to path data structure 138. An example of a path data structure entry 138F is shown in FIG. 1D, which is described below.

Figure 1D:
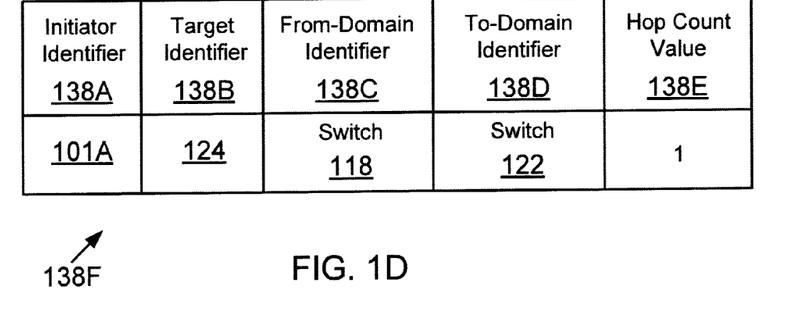

With reference to FIG. 1D, the path data structure entry 138F includes column 138A that stores an initiator identifier for identifying initiator 101A. Column 138B includes a target identifier that identifies target system 124. Column 138C includes a "From-Domain" identifier that identifies the switch domain (for example, switch 118) before the packet reaches its destination domain (for example, switch 122). Column 138D stores a "To-Domain" identifier, for example, switch 122 that is connected to target 124. The hop count value in column 138E identifies the number of switch hops a frame takes before it reaches the target system 124, which in this example is equal to 1 because there is only 1 hop between switch 118 and switch 122.

In one embodiment, path data structure 138 may be a relational database that is used to identify initiators that need to be notified when congestion is detected at switch ports. The initiators are identified based on the congestion type and the notification also depends on the congestion type, as described below in more detail.

Figure 1E:
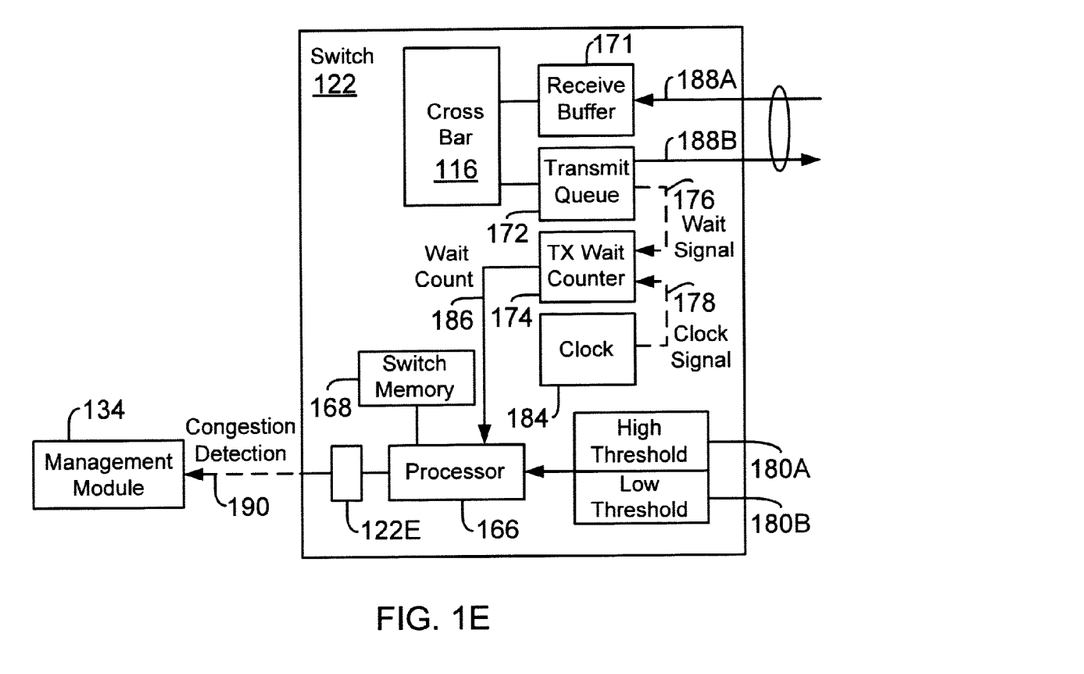

FIG. 1E shows an example of a system used by switch 122 to notify management module 134 of congestion within system 100. As an example, there may be two types of congestion at a switch port, edge congestion and interior congestion that are now described in detail.

Edge congestion occurs when an egress port (i.e. a transmitting port) at a switch has information available for transmission but a destination device port (ingress port) is not able to receive the information. For example, port 122C of switch 122 may have data available for transmission to target port 124A at any given time, but target port 124A may not be ready to receive data from port 122C. Typically, edge congestion is caused when one or more initiators send write commands at a high rate and the target system is not able to write data at a similar pace. When the target system slows down, switch port 122C gets congested.

Interior congestion occurs when a switch port has available data but another switch port within a destination path is not able to receive the data. For example, in the path between initiator 101A and target 124, a packet traverses switch 118 and switch 122. Port 118C of switch 118 may have data that is ready for transmission but port 122A of switch 122 may not be able to receive the data. This is referred to as interior congestion. Typically, interior congestion occurs when initiators are sending both read and write commands at a high rate.

In one embodiment, methods and systems are provided to detect congestion type and notify management module 134 so that corrective action can be taken. Management module 134 notifies the affected initiators to reduce the rate of write commands to reduce edge congestion and reduce the rate of both write and read commands to reduce interior congestion, as described below in more detail.

Referring again to FIG. 1E, switch 122 includes a receive buffer 171 that is used for storing information 188A received from other switch ports or devices. Switch 122 also includes a transmit queue 172 that is used to temporarily store packets 188B before they are transmitted by switch 122. In one embodiment, each switch port (i.e. 122A-122E FIG. 1A) includes a receive buffer 171 for receiving packets and a transmit queue 172 for temporarily storing packets that are transmitted.

The transmit queue 172 is monitored by using a transmit wait counter 174 (also referred to as counter 174) that counts the duration when transmission from transmit queue 172 is suspended. Counter 174 is increased when a "waiting" signal 176 is received from transmit queue 174. The waiting signal 174 is generated when the transmit queue 172 is waiting to transmit a frame. The interval for increasing counter 174 is based on a clock signal 178 from clock 184.

Switch 122 stores a high threshold value 180A (also referred to as a first threshold value) and a low threshold value 180B (also referred to as a second threshold value) at a memory location (for example, 168, FIG. 1C). The high threshold value 180A is used to detect congestion and the low threshold value is used to detect end of congestion, according to one embodiment and as described below in more detail.

Processor 166 periodically monitors counter 174 and if the counter value reaches the high threshold value 180A congestion is detected. To notify management module 134 of the congestion, processor 166 generates a message 190 that is sent to management module 134, which can then take corrective measures to reduce congestion. Message 190 includes information regarding congestion, as described below in more detail.

Processor 166 detects end of congestion, when the value of counter 174 reaches the low threshold value 180B. In this case, message 190 notifies the management module 134 of the end of congestion so that it can notify the affected initiators.

In one embodiment, processor 166 monitors the average running count for counter 174. When the average count reaches the high threshold value 180A, then congestion is declared. When the average count reaches the low threshold value 180B, then end of congestion is declared.

As mentioned above, processor 166 periodically samples the value of counter 174. At any given time, processor 166 determines the difference between a current wait count value and a previously sampled value. The difference (New_Delta) is then used to update a running average of the counter value.

If a port is not currently in a congested state, then the average is compared with the high threshold value 180A to detect congestion. If the port is already in the congested state, then the average is compared with the low threshold value 180B to detect end of congestion.

Figure 2:
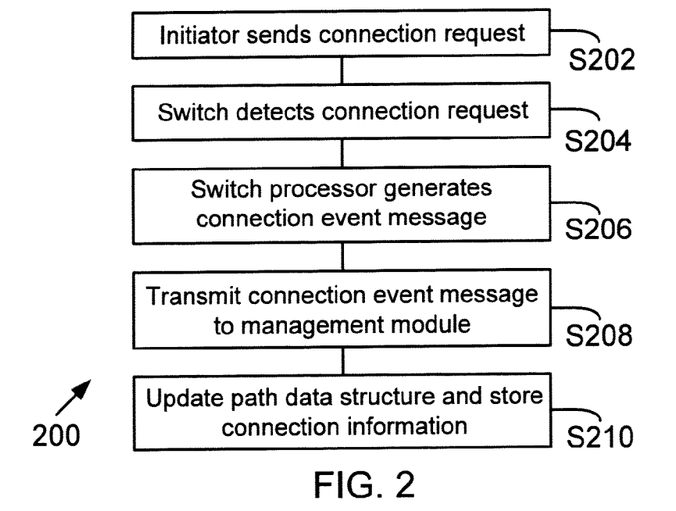
FIG. 2 shows a process flow diagram for configuring congestion management, according to one embodiment.

Process Flow:

FIG. 2 shows a process 200 for updating the path data structure 138, according to one embodiment. Process 200 is described below with respect to the example of FIG. 1C, but is not limited to switch 122 or any other component.

Process 200 begins when an initiator (for example, 101A) sends a login request 160 (for example, a PLOGI) to connect with target system 124. In block S204, pattern match module 162 detects the login request 160 and sends a copy of the request to processor 166.

In block S206, processor 166 generates a connection event message 170. Processor 166 traces the connection path between initiator 101A and target 124 and identifies the various components within the connection path. In block S208, the connection event message 170 is sent to management module 134.

In block S210, processor 135 updates path data structure 138. In one embodiment, processor 135 retrieves information from connection message 170 and updates path data structure 138. An example of a path data structure entry 138F is shown in FIG. 10 and described above in detail.

In one embodiment, login request monitoring is only performed on switches that are connected to initiators, for example, switch 118 and switch 120.

In one embodiment, the path data structure 138 provides management module 134 with information that is readily available and used for reducing both edge and interior congestion, as described below in more detail.

Figure 3A:
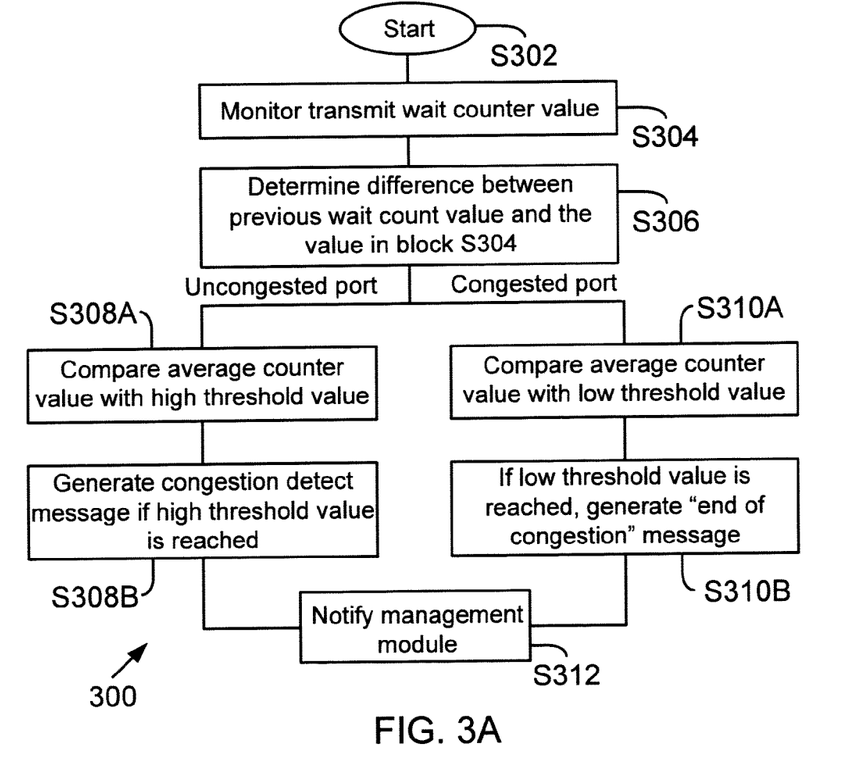
FIG. 3A shows a process flow diagram for monitoring congestion, according to one embodiment.

FIG. 3A shows a process 300 for monitoring packet transmission for interior and edge congestion, according to one embodiment. Process 300 is described below with respect to FIG. 1E as an example.

Process 300 starts in block S302 when the various switches and other modules of system 100 are initialized and ready to communicate. In block S304, processor 166 monitors the value of transmit wait counter 174. As described above, transmit wait counter 174 is updated when a wait signal 176 is asserted because a port is not able to transmit available data packets.

In block S306, processor 166 determines the difference between the value ascertained in block S304 and a previous value. The difference is then used to update a running average value of counter 174.

In block S308A, if the port is not in a congested state, processor 166 compares the average count with the high threshold value 180A. If the average has reached the high threshold value 180A, then congestion is detected and in block S308B, processor 166 generates a congestion detect message.

If the port in question is already congested, then in block S310A, processor 166 compares the average counter value with the low threshold value 180B. If the low threshold value 180B is reached, then processor 166 concludes end of congestion. Thereafter, in block S310B, an "end of congestion" message is generated indicating that congestion at the port has ended.

In block S312, the congestion detect or the end of congestion message is sent to management module 134. The management module 134 may then take appropriate measures to handle congestion or end of congestion, as described below with respect to FIG. 4.

Figure 3B:
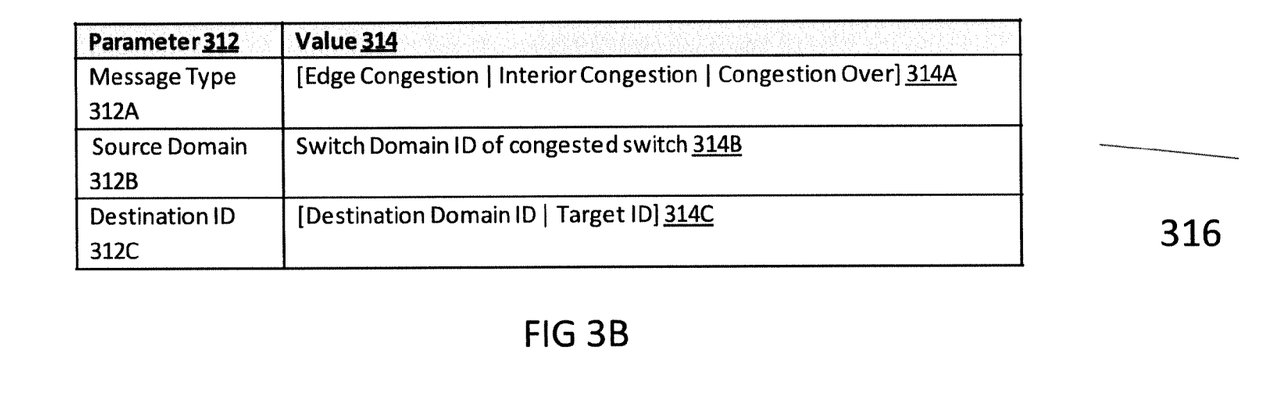
FIGS. 3B-3E show examples of congestion related messages sent by a congested switch, according to one embodiment.

FIG. 3B shows an example of a message 316 used for notifying management module 134. Message 316 includes parameter 312 and a value 314. Parameter 312 includes a message type 312A. The message type may have a value 314A to indicate edge congestion, interior congestion or when congestion is over. Parameter 312 also includes a source domain identifier 312B that may have a value 314B for providing a domain identifier of a congested switch, for example, switch 122. Parameter 312 also includes a destination identifier having a value 314C, which may include a destination switch domain identifier (for example, domain identifier for switch 118 or a target identifier, for example, 124).

Figure 3C:
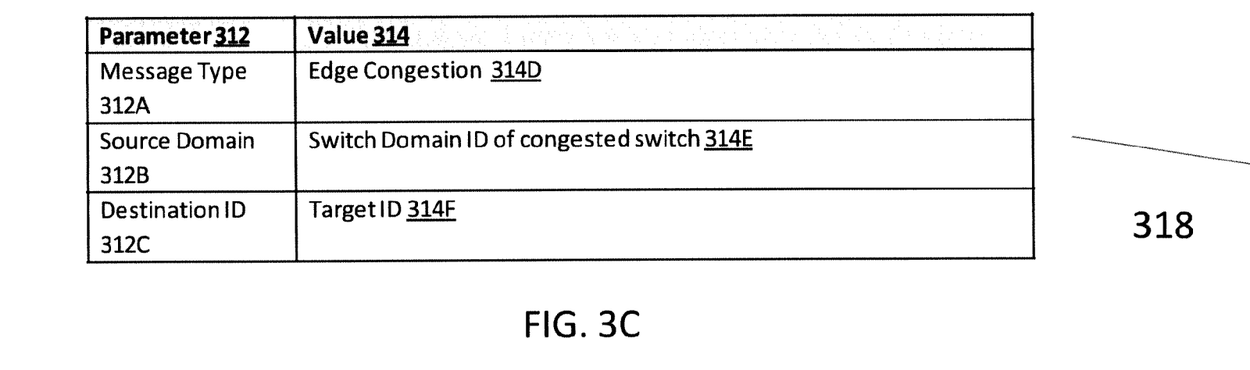

FIG. 3C shows an example of an edge congestion message 318 for notifying management module 134 of edge congestion at switch 122. In this example, the message type has a value 314D that indicates edge congestion. The switch domain identifier for the congested switch is provided by 314E. As an example, 314E would identify switch 122. The destination identifier is provided by a target identifier 314F. As an example, target identifier 314F identifies target port 124A, if target 124 is the one affected by the edge congestion.

Figure 3D:
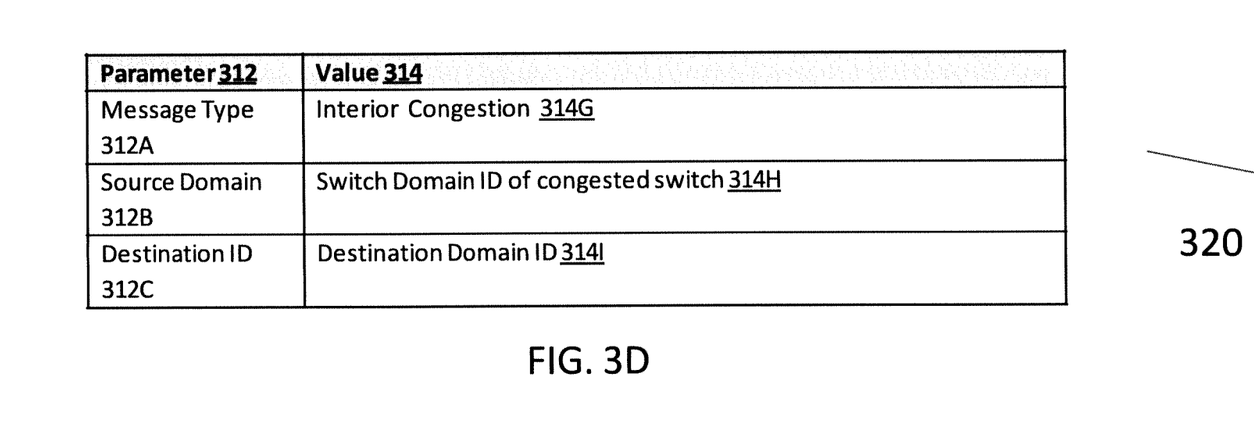

FIG. 3D shows an example of interior congestion message 320 for notifying management module 134 of interior congestion at switch 122. The message type has a value 314G that indicates interior congestion. The switch domain identifier 314H provides the domain identifier for the congested switch, i.e. for this example, switch 122 is identified as the congested switch. The destination switch domain identifier is provided by 314I. In this example, switch 118 is identified by 314I.

Figure 3E:
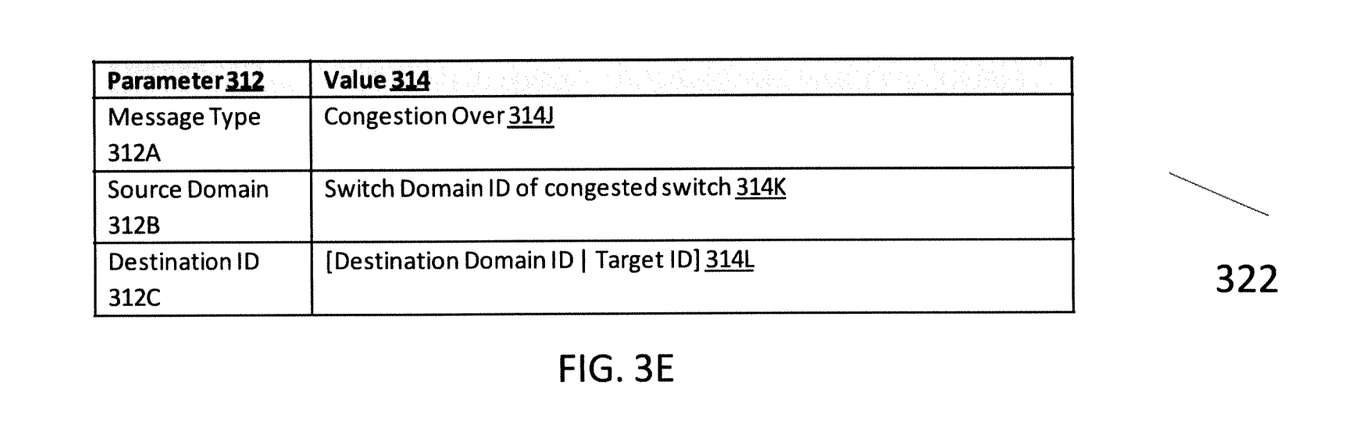

FIG. 3E shows an example of a message 322 indicating that congestion is over at switch 122. The message type 314J indicates that congestion is over. The switch domain identifier is provided by 314K. As an example, 314K identifies switch 122. The destination and target identifiers are 314L. The destination switch domain and target identifiers are provided by domain identifier values 314L. As an example, target port 124A and switch 118 are identified by 314L.

Figure 4:
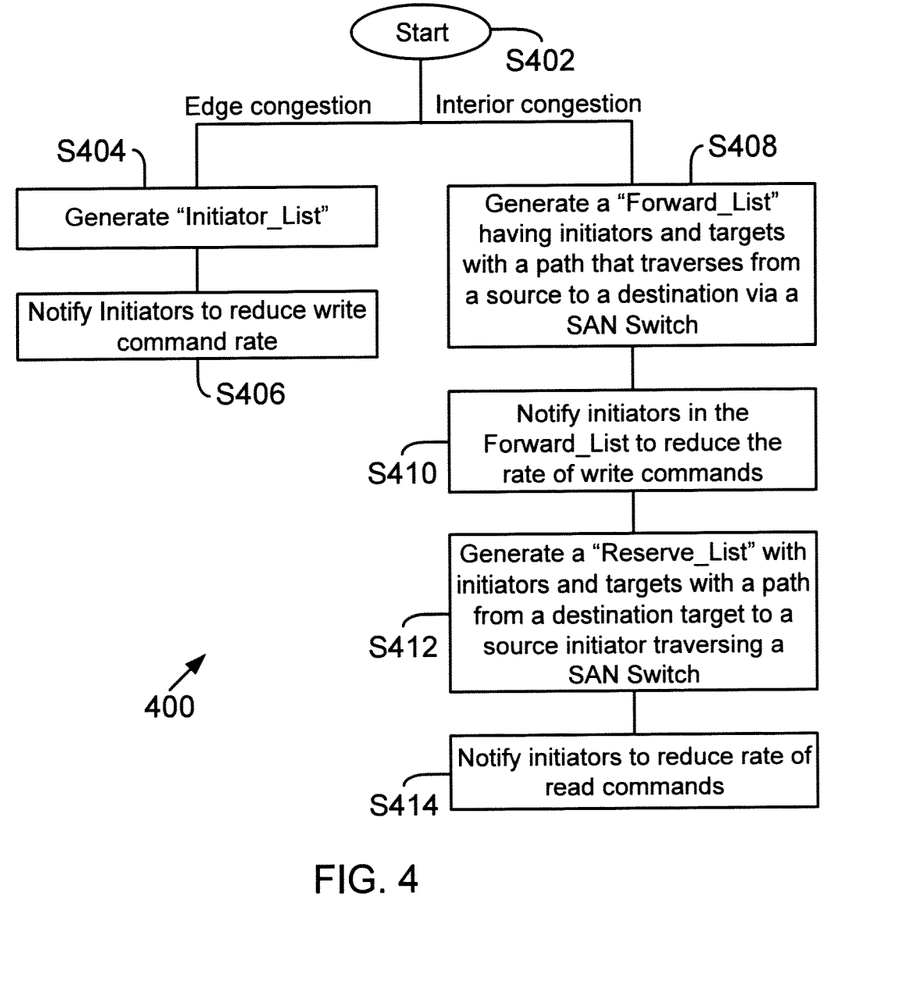
FIG. 4 shows a process flow diagram for handling edge and interior congestion, according to one embodiment.

FIG. 4 shows a process 400 for handling interior and edge congestion notifications, according to one embodiment. The congestion type may be specified by the congestion event message that is sent by switch 122 in block S312, described above with respect to FIG. 3A.

Process 400 begins in block S402. Blocks S404/S406 are for edge congestion, while blocks S408/S410/S412/S414 are for interior congestion.

In block S404, management module 134 builds an "initiator_list" that may be stored at a memory location accessible to processor 135. The initiator_identifies initiators that access a congested target system. For example, with reference to FIG. 1A, initiators 101C and 101D are included in the initiator_list when both initiators access target system 124 via port 122C and target system 124 is congested when identified by congestion detect message in block S312 of FIG. 3.

In one embodiment, the initiator_list may be generated by a Structured Query Language (SQL) command issued to path data structure 138. An example of one such command is "SELECT Initiator AS Initiator_List WHERE Congestion Target=Target." In this command, processor 135 generates the initiator_list by using the path data structure 138 as shown in FIG. 1D and obtains information regarding the initiators that access the congested target system.

In block S406, management module 134 notifies the initiators in the initiator_list to only reduce the rate of write commands. One reason for only reducing the rate of write commands is because edge congestion is due to a target system's inability to receive information. When the rate of write commands is reduced, the congestion at target system 124 is reduced as well.

If the congestion reported by a congestion event message is for interior congestion, then in block S408, a "forward_list" of initiators is generated by management module 134. The forward_list includes a list of initiators/targets with a path starting from a source initiator via a SAN switch to a target. The forward_list may be generated by processor 135 and stored at a memory location that is accessible to processor 135. The forward_list is used to notify initiators to reduce the rate of write commands.

In one embodiment, a SQL command to generate the forward_list may be: "Select Initiator, Target AS Forward_List FROM Path Table WHERE Source=From_Domain AND Destination=To_Domain GROUP BY Initiator." In this command, the Path_Table is the path data structure 138. The "From_Domain" value is based on column 138C (FIG. 1D), while the "To_Domain" value is based on column 138D.

Once the forward_list is generated, the initiators in the forward_are notified in block S410 to reduce the rate of write commands to the targets affected by the interior congestion.

In block S412, a "reverse_list" is generated by management module 134. It is noteworthy that blocks S408 and S412 may occur at the same time. The reverse_list may be generated by processor 135 and stored at any memory location that is accessible to processor 135. The reverse_list identifies the initiators that are sent a notification to reduce the rate of read commands.

The reverse_list is generated by using path data structure 138. In one embodiment, a SQL command may be used to generate the reverse_list. An example of a SQL command to generate the reverse_list is "SELECT Initiator, Target AS Reverse_List FROM Path Table WHERE Source=To_Domain AND Destination=From_Domain GROUP BY Initiator." In this command, the Path_Table refers to the path data structure 138. The "From_Domain" value is based on column 138C of FIG. 1D, while the "To_Domain" value is based on column 138D of FIG. 1D.

In block S414, the initiators identified in the reverse_list are notified to reduce the rate of read commands to alleviate the interior congestion. The notification also identifies the affected target.

It is noteworthy that for interior congestion, both read and write command rates are reduced. One reason for reducing the read and write rates is that a switch port that is congested may be congested due to traffic from both an initiator (i.e. write data) and a target (read data).

In one embodiment, the initiators may take different measures to reduce the rate of read and write commands. Such measures may include adjusting the rate at which I/O requests are generated and/or limit the amount of data that is sent by the initiators or read by the initiators.

Although the present disclosure has been described with reference to specific embodiments, these embodiments are illustrative only and not limiting. Many other applications and embodiments of the present invention will be apparent in light of this disclosure and the following claims.

References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method for a network having a computing system interfacing with a storage system via a switch, comprising:
    comparing an average transmit wait count value with a first threshold value, where the average transmit wait count value is updated when a switch port has a frame available for transmission but is unable to transmit the frame if a port of the storage system is unable to receive the frame or if another switch port is unable to receive the frame;
    generating a congestion message for notifying a management module of congestion at the switch port when the average transmit wait count value reaches the first threshold value;
    notifying the computing system to only reduce a rate of write operations to reduce congestion, when the port of the storage system is unable to receive the frame; and
    notifying the computing system to reduce both the rate of write operations and a rate of read operations, when the another switch port is unable to accept the frame.

2. The method of claim 1, further comprising:
    comparing the average transmit wait count value with a second threshold value to determine if congestion has ended at the switch port; and
    generating an end of congestion message when the average transmit wait count value reaches the second threshold value.

3. The method of claim 1, further comprising:
    generating a first list and a second list for notifying the computing system to reduce both the rate of write operations and the rate of read operations, when the another switch port is unable to accept the frame.

4. The method of claim 3, wherein the first list includes initiators that access the storage system via the congested switch port for writing information.

5. The method of claim 3, wherein the second list includes initiators that read information via the congested switch port.

6. The method of claim 1, further comprising:
    generating an initiator list for notifying the computing system to only reduce the rate of write operations to reduce congestion, when the port of the storage system is unable to receive the frame.

7. The method of claim 1, wherein the management module maintains a path data structure for storing an identifier identifying the computing system, an identifier identifying the storage system, a hop count value indicating a number of hops a packet takes prior to reaching the switch coupled to the storage system, a first domain identifier identifying a switch domain prior to the switch coupled to the storage system and a second domain identifier identifying the switch coupled to the storage system.

8. The method of claim 1, wherein the path data structure entry is updated when a login request is received by the switch from an initiator port.

9. The method of claim 8, wherein the login request is a PLOGI frame.

10. The method of claim 8, wherein the switch includes a pattern matching module that recognizes the login request and forwards the login request to a switch processor.

11. The method of claim 10, wherein the switch processor determines a path between the computing system and the storage system and sends a connection event message with the path information to the management module.

12. A switch element, comprising:
    a first port coupled to another switch element that is also coupled to an initiator that initiates input/output requests for reading information from a storage system and writing information at the storage system;
    a second port coupled to the storage system;
    a transmit counter that counts a duration that the second port waits to transmit an available frame; and
    a processor that compares an average transmit wait count value with a first threshold value, where the average transmit wait count value is updated when the second port has a frame available for transmission but is unable to transmit the frame if a port of the storage system is unable to receive the frame or if another switch port is unable receive the frame;
    wherein the processor generates a congestion message notifying a management module of congestion at the second port when the average transmit wait count value reaches the first threshold value, and the management module notifies the initiator to only reduce a rate of write operations to reduce congestion, when the port of the storage system is unable to accept the frame, and to reduce both the rate of write operations and a rate of read operations, when the another switch port is unable to accept the frame.

13. The switch element of claim 12, wherein the processor compares the average transmit wait count value with a second threshold value to determine if congestion has ended at the switch port, and generates an end of congestion message when the average transmit wait count value reaches the second threshold value.

14. The switch element of claim 12, wherein the management module generates a first list and a second list for notifying the initiator to reduce both the rate of write operations and the rate of read operations, when the another switch port is unable to accept the frame.

15. A system, comprising:
    an initiator operationally coupled to a storage system via a first switch element and a second switch element for reading information from the storage system and writing information at the storage system; and
    a management system operationally coupled to the initiator, the first switch element and the second switch element;
    wherein the second switch element includes a first port coupled to the first switch element that is also coupled to the initiator, a second port coupled to the storage system, a transmit counter that counts a duration that the second port waits to transmit an available frame, and a processor that compares an average transmit wait count value with a first threshold value, where the average transmit wait count value is updated when the second port has a frame available for transmission but is unable to transmit the frame if a port of the storage system is unable to receive the frame or if another switch port is unable to receive the frame; and wherein the processor generates a congestion message notifying the management module of congestion at the second port when the average transmit wait count value reaches the first threshold value, and the management module notifies the initiator to reduce a rate of write operations to reduce congestion when the port of the storage system is unable to accept the frame, and to reduce both the rate of write operations and a rate of read operations when the another switch port is unable to accept the frame.

16. The system of claim 15, wherein the processor compares the average transmit wait count value with a second threshold value to determine if congestion has ended at the switch port, and generates an end of congestion message when the average transmit wait count value reaches the second threshold value.

17. The system of claim 15, wherein the management module generates a first list and a second list for notifying the initiator to reduce both the rate of write operations and the rate of read operations, when the another switch port is unable to accept the frame.

18. The system of claim 15, wherein the management module maintains a path data structure for storing an identifier identifying the initiator, an identifier identifying the storage system, a hop count value indicating a number of hops a packet takes prior to reaching the switch; a first domain identifier identifying the first switch element and a second domain identifier identifying the second switch element.

19. The system of claim 15, wherein the path data structure entry is updated when a login request is received by the first switch element.

20. The system of claim 19, wherein the first switch element includes a pattern matching module that recognizes the login request and forwards the login request to a switch processor.

* * * * *

UNITED STATES PATENT AND TRADEMARK OFFICE
CERTIFICATE OF CORRECTION

PATENT NO. : 8,441,922 B1
APPLICATION NO. : 13/216598
DATED : May 14, 2013
INVENTOR(S) : Edward C. McGlaughlin et al.

It is certified that error appears in the above-identified patent and that said Letters Patent is hereby corrected as shown below:

In the Specification:

In column 10, line 3, delete "initiator_identifies" and insert -- initiator_list identifies --, therefor.

In column 10, lines 13-14, delete "Congestion Target=Target." and insert -- Congestion_Target=Target. --, therefor.

In column 10, line 36, delete "Path Table" and insert -- Path_Table --, therefor.

In column 10, line 42, delete "forward_are" and insert -- forward_list are --, therefor.

In column 10, line 55, delete "Path Table" and insert -- Path_Table --, therefor.

In column 11, lines 13-25, delete "References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art." and insert the same on Col. 11, Line 12, after "claims." as a Continuation of the Paragraph.

Signed and Sealed this
Twentieth Day of August, 2013

Teresa Stanek Rea
*Acting Director of the United States Patent and Trademark Office*